United States Patent
Kiribayashi

(10) Patent No.: US 7,039,503 B2
(45) Date of Patent: May 2, 2006

(54) VEHICLE OCCUPANT DETECTION APPARATUS PROVIDING STATUS INFORMATION CONCERNING OCCUPANT OF VEHICLE SEAT

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/673,277

(22) Filed: Sep. 30, 2003

(65) Prior Publication Data

US 2004/0068357 A1 Apr. 8, 2004

(30) Foreign Application Priority Data

Oct. 2, 2002 (JP) ............................. 2002-289738

(51) Int. Cl.
*B60R 21/01* (2006.01)
*G01G 19/08* (2006.01)

(52) U.S. Cl. .............................. 701/1; 701/45; 180/271

(58) Field of Classification Search ................. 701/45, 701/46, 1; 180/271, 273, 282; 280/735, 280/734, 728.1; 342/72
See application file for complete search history.

(56) References Cited

U.S. PATENT DOCUMENTS

| | | | | |
|---|---|---|---|---|
| 5,483,635 A | * | 1/1996 | Kameyama | 714/14 |
| 5,689,421 A | | 11/1997 | Görnig | |
| 6,081,044 A | * | 6/2000 | Anthofer et al. | 307/10.1 |
| 6,275,756 B1 | * | 8/2001 | Griggs et al. | 701/45 |
| 6,327,528 B1 | * | 12/2001 | Vallette et al. | 701/45 |
| 6,555,766 B1 | * | 4/2003 | Breed et al. | 177/144 |
| 6,683,534 B1 | * | 1/2004 | Patterson et al. | 340/436 |
| 2002/0175490 A1 | * | 11/2002 | Sakai et al. | 280/273 |

* cited by examiner

*Primary Examiner*—Thomas G. Black
*Assistant Examiner*—Dalena Tran
(74) *Attorney, Agent, or Firm*—Posz Law Group, PLC

(57) ABSTRACT

A vehicle occupant detection apparatus having a plurality of load sensors located to produce analog signals indicative of the presence/absence of a seat occupant and the type of seat occupant (adult or child), in which the analog signals are supplied to an occupant detection ECU to be converted to digital form and judged, and in which the occupant detection ECU and load sensors are powered by the same power supply, so that the accuracy of A/D conversion is unaffected by variations in supply voltage, and moreover only a single stream of encoded digital data, conveying seat status information, is supplied to an air bag control apparatus.

14 Claims, 4 Drawing Sheets

VEHICLE OCCUPANT DETECTION APPARATUS PROVIDING STATUS INFORMATION CONCERNING OCCUPANT OF VEHICLE SEAT

BACKGROUND OF THE INVENTION

1. Field of Application

The present invention relates to a vehicle occupant detection apparatus for judging the status of a vehicle occupant who is seated in a seat of a vehicle, and for transmitting the results of the judgement to a vehicle occupant protection apparatus.

2. Description of Prior Art

In the prior art, a type of vehicle occupant protection apparatus has been proposed which is configured of a sensor formed of an electromechanical switch for detecting the presence or absence of a vehicle occupant in a seat of a vehicle, and a signal generating section that is provided within the sensor unit, for transmitting a coded signal indicative of the vehicle occupant presence or absence via a communication line to an air bag deployment apparatus.

Furthermore a vehicle occupant detection apparatus has recently been proposed whereby the loads imposed on a vehicle seat are measured at a plurality of locations by a plurality of strain gage load sensors that are mounted on the seat rails, i.e., for thereby measuring the weight of the individual who is occupying the seat. The objective is to enable the apparatus to not merely determine the presence or absence of a person in the seat concerned, but also to judge the type of vehicle occupant in that seat, i.e., to judge whether the person is adult, child, etc.

However with such a type of apparatus which judges the type of seat occupant by means of a plurality of strain gage load sensors, in order to be able to transmit the results of judgement of the seat occupant to an air bag deployment apparatus in the form of encoded data, it is necessary to provide the air bag deployment apparatus with a number of data input ports that is equal to the number of strain gage load sensors. Hence, a CPU that is used as a control section of the air bag deployment apparatus will be high in cost, while in addition each of the load sensors will be large in scale, making it difficult to mount these on the seat rails.

SUMMARY OF THE INVENTION

It is an objective of the present invention to overcome the problems of the prior art set out above, by providing a vehicle occupant detection apparatus whereby various functions can be appropriately concentrated, such as to enable the load sensors to be made small in size while also enabling the overall cost of the apparatus to be low.

To achieve the above objective, according to a first aspect, the invention provides a vehicle occupant detection apparatus comprising a control apparatus and at least one load sensor for generating load data concerning a vehicle seat, with the control apparatus including a processing section for judging the occupancy status of the vehicle seat based upon said load data and for generating judgement results in digital data form, a power supply section for supplying electrical power to said processing section, and a communication section for transmitting results of said judgement of vehicle occupant status by said processing section to a vehicle occupant protection apparatus, wherein said load sensor operates from electrical power that is supplied from said power supply section of said control apparatus. The term "power supply" as used herein is to be understood as signifying a DC power supply, and "electrical power" as DC power.

Hence, a power supply section in the control apparatus supplies electrical power to both the processing section of that control apparatus and also to each of the load sensors of a seat for which the occupancy status (i.e., presence or absence of a seat occupant, and type of occupant, if present) is to be judged. The processing section performs that judgement based upon the load data that are produced by the load sensors, while the communication section transmits the judgement results to the vehicle occupant protection apparatus (i.e., air bag deployment apparatus). Thus it is not necessary to provide a power supply adjacent to the load sensors, so that these can be made small in size and can be readily mounted at appropriate locations such as on the seat rails.

Furthermore, due to the fact that the same power supply is used in common by the processing section and the load sensors, variations in the power supply voltage will not result in lowering of the accuracy of the digital data expressing the judgement results that are generated by the processing section.

More specifically, each load sensor (e.g., strain gage load sensor) produces an analog voltage signal whose level is indicative of a level of imposed load, and the processing section includes an A/D converter for converting the analog voltage signals produced from the load sensors to digital data. The A/D converter may for example basically operate by comparing each of successive samples of an input analog voltage signal with reference voltage values (values corresponding to successive quantization step levels, or successive values of a linearly increasing ramp voltage, for example) that will vary in direct proportion to the level of the DC supply voltage from which the processing section operates. In addition, the analog voltage signal produced from a load sensor varies in direct proportion to the DC supply voltage from which the load sensor operates. Hence, by operating the load sensors and the processing section from a common power supply, it is ensured that variations in the power supply voltage will not affect the accuracy of the digital output data produced from the processing section, without requiring to increase the manufacturing cost of the apparatus by incorporation of voltage stabilizer circuits.

Furthermore, since it is not necessary to provide an A/D converter circuit adjacent to the load sensors, this further serves to ensure that the load sensors can be made small in scale and of simple configuration.

DESCRIPTION OF PREFERRED EMBODIMENT

Figure 1:
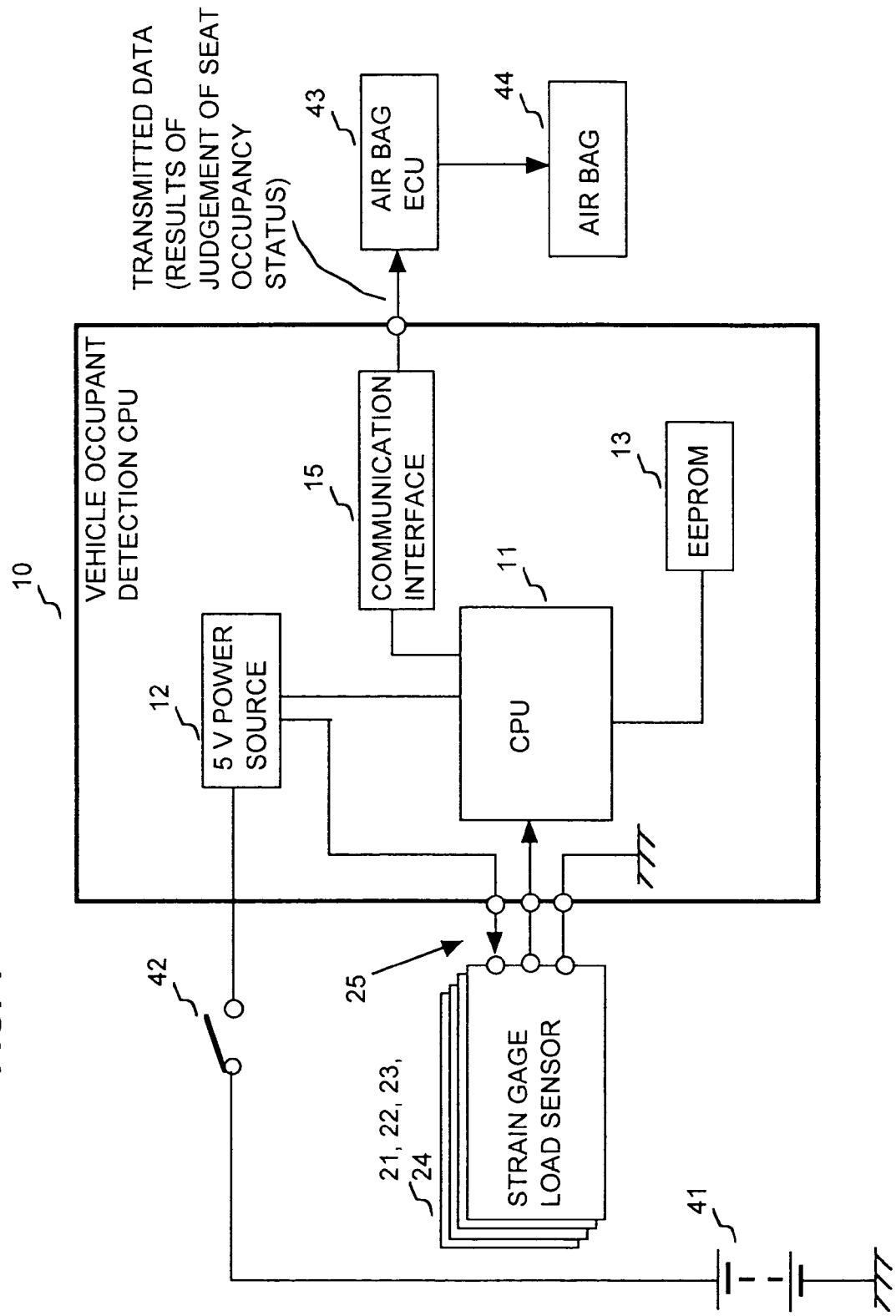
FIG. 1 is a block diagram illustrating the hardware configuration of an embodiment of a vehicle occupant detection apparatus, and its connection to an air bag deployment system.
Figure 3:
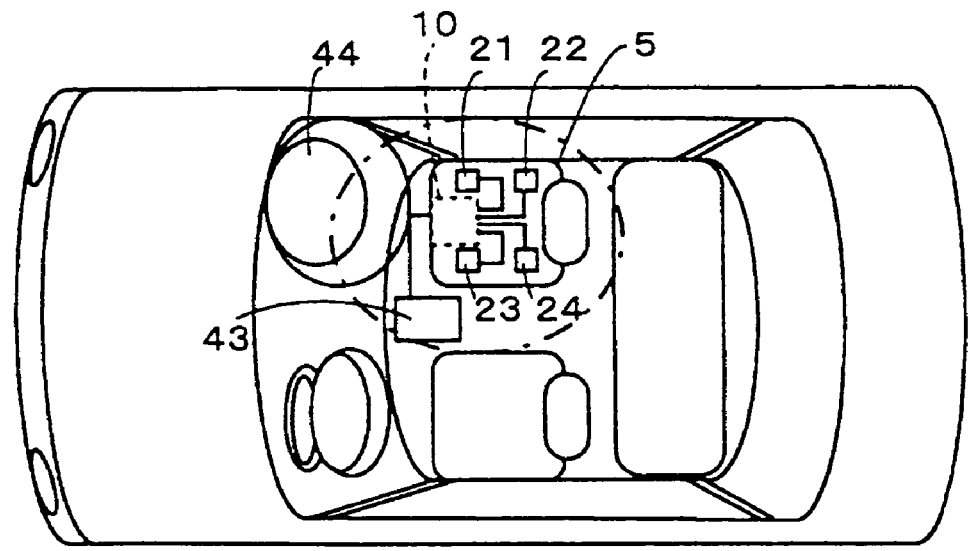
FIG. 3 is a conceptual cross-sectional view of a the passenger compartment of a vehicle in which the vehicle occupant detection apparatus embodiment is installed.
Figure 4:
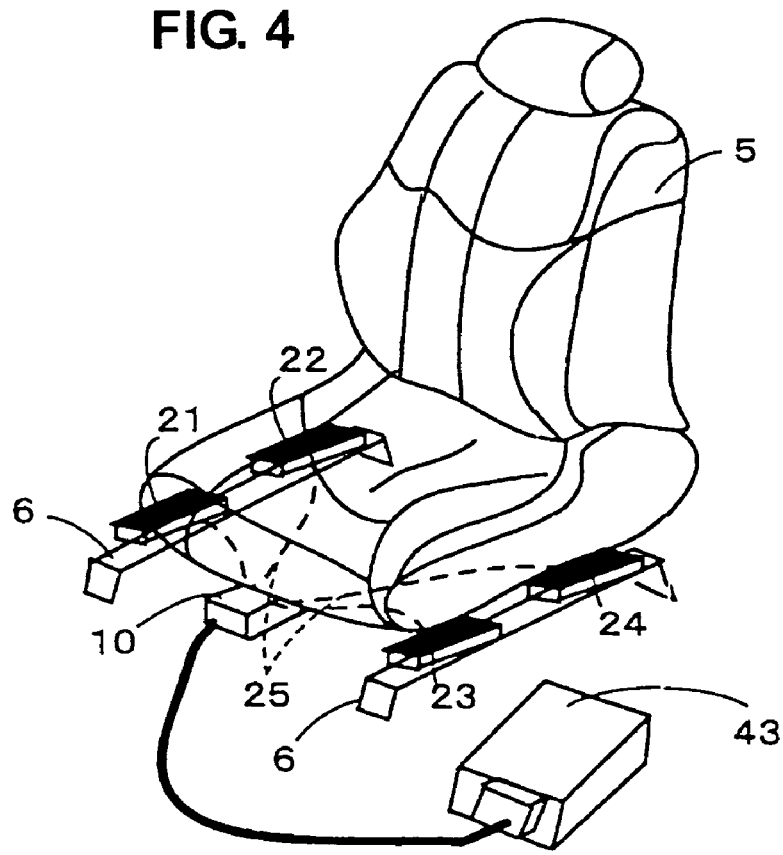
FIG. 4 is an oblique view of a vehicle seat, illustrating the locations of load sensor elements of the vehicle occupant detection apparatus.

In FIG. 1, a vehicle occupant detection apparatus embodiment is shown which is formed of a control apparatus, designated as the vehicle occupant detection CPU 10, and four strain gage load sensors (referred to in the following simply as load sensors) 21, 22, 23, 24. As shown in FIGS. 3, 4, the vehicle occupant detection CPU 10 is disposed below the vehicle seat 5 which is the object of vehicle occupant detection by this embodiment. As shown in FIG. 1, the vehicle occupant detection CPU 10 is formed of a CPU 11, a 5 V power supply 12, an EEPROM 13, and a communication interface 15. The CPU 11 constitutes a processing section, the 5 V power supply 12 constitutes a power supply section, and the communication interface 15 constitutes a communication section, as respectively set out in the appended claims for a vehicle occupant detection apparatus.

Figure 2:
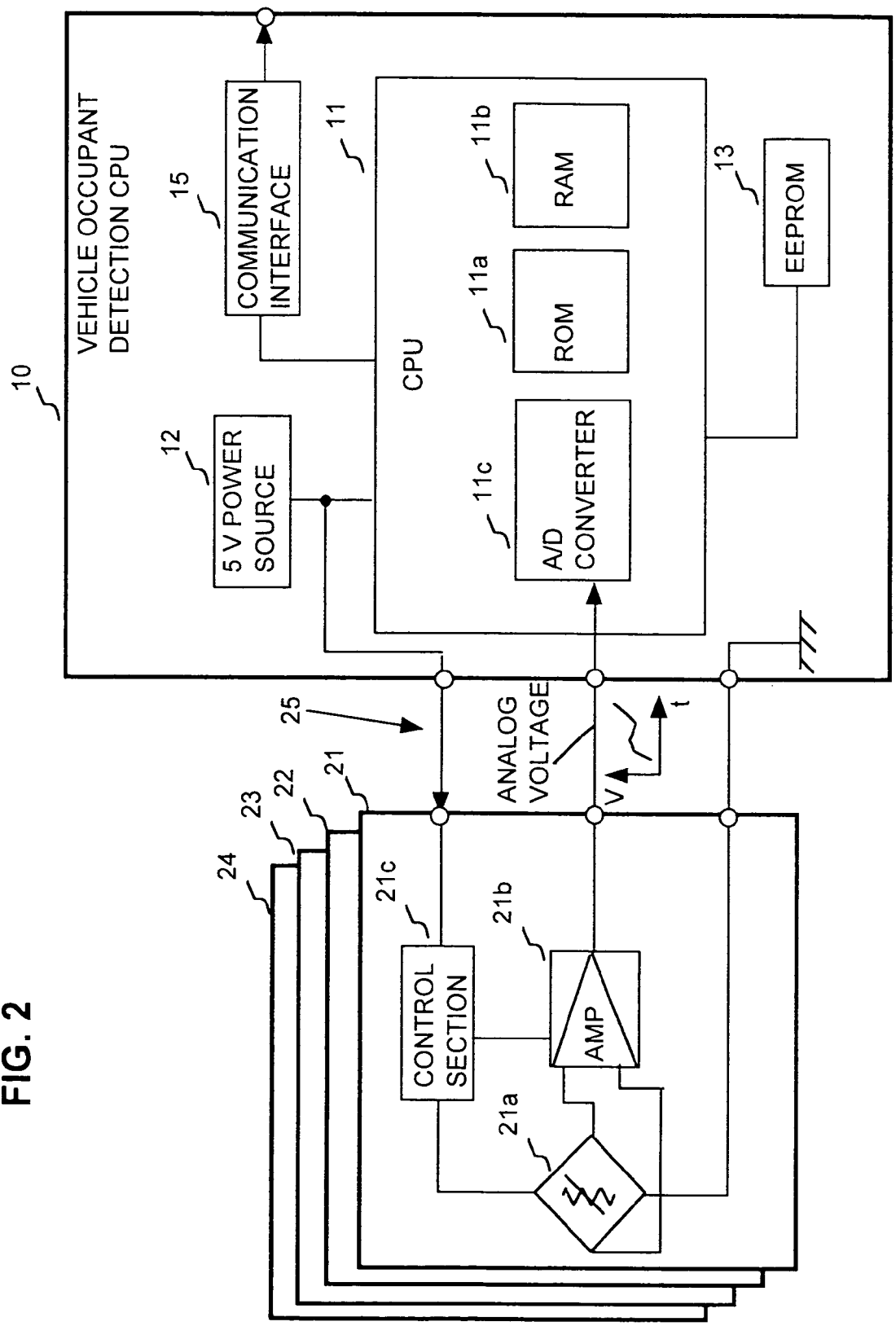
FIG. 2 shows details of the internal configuration of a vehicle occupant detection CPU and a load sensor which appear in FIG. 1.

As shown in FIG. 2, the CPU 11 is formed of a ROM 11a, a RAM 11b and an A/D converter 11c, and operates from 5 V DC supply voltage produced from the 5 V power supply 12. The ROM 11a has stored therein beforehand a vehicle occupant detection program, which is executed by the CPU 11. In addition the ROM 11a has stored therein beforehand a "seat vacant" status threshold value, and a seat occupant discrimination threshold value, as described hereinafter. The RAM 11b is used as a work area by the CPU 11. The A/D converter 11c performs conversion of the respective analog voltage signals which are produced by the load sensors 21, 22, 23, 24 and transferred via the connecting leads 25 to the vehicle occupant detection CPU 10, to corresponding digital signals.

As shown in FIG. 1, the 5 V power supply 12 is connected via an ignition switch 42 to the battery 41, and converts the 12V supply of the battery 41 to obtain the aforementioned 5 V supply. The EEPROM 13 is a rewritable non-volatile memory, and is used to store diagnostic information concerning failure contents, when failure of any of the load sensors 21, 22, 23, 24 or of the vehicle occupant detection CPU 10 occurs.

The communication interface 15 is connected via a communication line 45 to the air bag ECU 43, and serves as an interface circuit for transmitting the occupancy status judgement results which are obtained by the CPU 11 concerning the vehicle seat 5, to the air bag ECU 43.

As shown in FIG. 4 the load sensors 21, 22, 23, 24 are respectively mounted at forward and rearward positions on the right-side one of the seat rails 6 of the vehicle seat 5 and at forward and rearward positions on the left-side one of the seat rails 6. The load sensors 21, 22, 23, 24 generate respectively analog voltage signals whose levels represent levels of load applied-at various parts of the vehicle seat 5. In addition to these analog voltage signals from the load sensors 21, 22, 23, 24 being supplied to the vehicle occupant detection CPU 10 via the connecting leads 25, the power supply voltage from the 5 V power supply 12 of the vehicle occupant detection CPU 10 is applied via the connecting leads 25 to each of the load sensors 21, 22, 23, 24, as an operating voltage.

As shown in more detail in FIG. 2, the load sensor 21 is formed of a sensor gage 21a, an amplifier 21b, and a control section 21c. The sensor gage 21a produces an analog voltage signal (gage voltage) whose level is proportional to the degree of strain which arises in a part of the seat rails 6 as a result of a vehicle occupant sitting in the vehicle seat 5.

The amplifier 21b serves to amplify the gage voltage and the control section 21c serves to modify the amplification of the amplifier 21b such as to obtain a linear output characteristic (i.e., a linear relationship between the applied strain and the output voltage level from the amplifier 21b). Each of the load sensors 22, 23, 24 is configured as shown for the load sensor 21.

The air bag ECU 43 functions as an air bag deployment control apparatus for the air bag 44. The air bag ECU 43 and air bag 44 in combination constitute a vehicle occupant protection apparatus as set out in the appended claims.

As shown in FIGS. 1 and 4, the air bag ECU 43 is connected via a communication line 45 to the communication interface 15 of the vehicle occupant detection CPU 10, with the vehicle occupant detection CPU 10 being located inside the passenger compartment of the vehicle. The air bag ECU 43 is configured to control deployment of the air bag 44 in accordance with the status judgement data that are supplied from the vehicle occupant detection CPU 10, in the event that a collision of the vehicle is detected by a G sensor (not shown in the drawings) which is connected to supply a detection signal to the air bag ECU 43. That is to say, when a collision is detected, the air bag ECU 43 effects control of the air bag deployment in accordance with whether the status judgement data indicate that the vehicle seat 5 is currently unoccupied, is occupied by an adult, is occupied by a child, etc. Specifically, when a collision is detected, the air bag 44 may selectively execute maximum deployment (when the status judgement data from the vehicle occupant detection CPU 10 indicate that an adult is occupying the vehicle seat 5), may execute partial deployment (e.g., when the status judgement data indicate that a child is occupying the vehicle seat 5), or may inhibit any deployment of the air bag (e.g., when the status judgement data indicate that the vehicle seat 5 is unoccupied).

The functions of the various sections of this vehicle occupant detection apparatus will be described in the following. Firstly, when the ignition switch 42 is set to the on position, the 12 V supply from the battery 41 is applied to the 5 V power supply 12, which converts the battery voltage to 5 V. This 5 V supply is applied to the CPU 11 within the vehicle occupant detection CPU 10, and is also applied through the connecting leads 25 to each of the load sensors 21, 22, 23, 24. In the load sensor 21 (and, in the same manner in each of the load sensors 22, 23, 24) the gage voltage which is generated by the sensor gage 21a and amplified by the amplifier 21b is adjusted by the control section 21c, with respective analog voltage signals being thereby produced by the load sensors 21, 22, 23, 24, constituting the load data. These analog voltage signals are transferred via the connecting leads 25 to the A/D converter 11c of the vehicle occupant detection CPU 10, through a multiplexer (not shown in the drawings). The A/D converter 11c performs A/D conversion of the multiplexed analog voltage signals, to derive respective streams of digital data which in combination constitute the load data in digital form.

In practical operation, the voltage of the battery 41 will vary from the nominal 12 V value, in accordance with factors such as the engine speed and the state of charge of the battery 41. However with the present invention as described hereinabove, since the A/D converter 11c and each of the load sensors 21, 22, 23, 24 operate from the same power supply voltage that is produced from the 5 V power supply 12, such variations in the output voltage of the battery 41 will not affect the accuracy of the load data which are derived in digital form by the A/D converter 11c.

With this embodiment each time that a set of four samples, from the analog voltage signals produced from the load sensors 21, 22, 23, 24 respectively, have been converted to a corresponding set of four digital values by the A/D converter 11c, the CPU 11 calculates the sum of these four digital values to obtain a value which expresses the weight of the occupant (if any) who is seated in the vehicle seat 5. The CPU 11 then compares that weight value with a predetermined "seat vacant" status threshold value, and if that threshold value is not exceeded then it is judged that the vehicle seat 5 is empty, while otherwise it is judged that there is an occupant in the vehicle seat 5. If the "seat vacant" status threshold value is exceeded, then the weight value is compared with a seat occupant discrimination threshold value. If that threshold value is not exceeded then it is judged that a child is seated in the vehicle seat 5, while otherwise it is judged that an adult is seated in the vehicle seat 5.

Figure 5A:
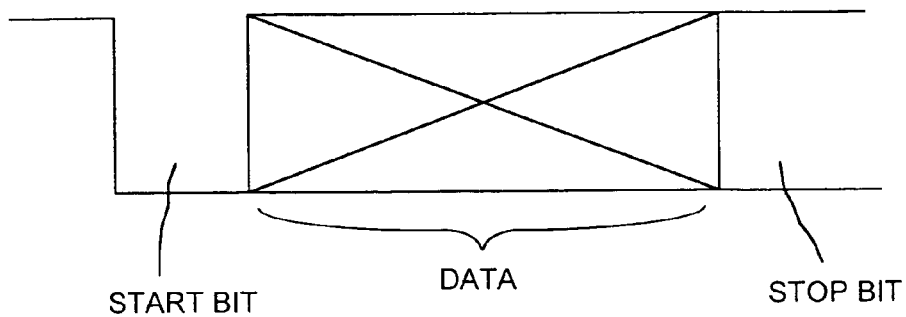
FIG. 5A illustrates the configuration in which data from a vehicle occupant detection apparatus are transmitted to an air bag ECU.
Figure 5B:
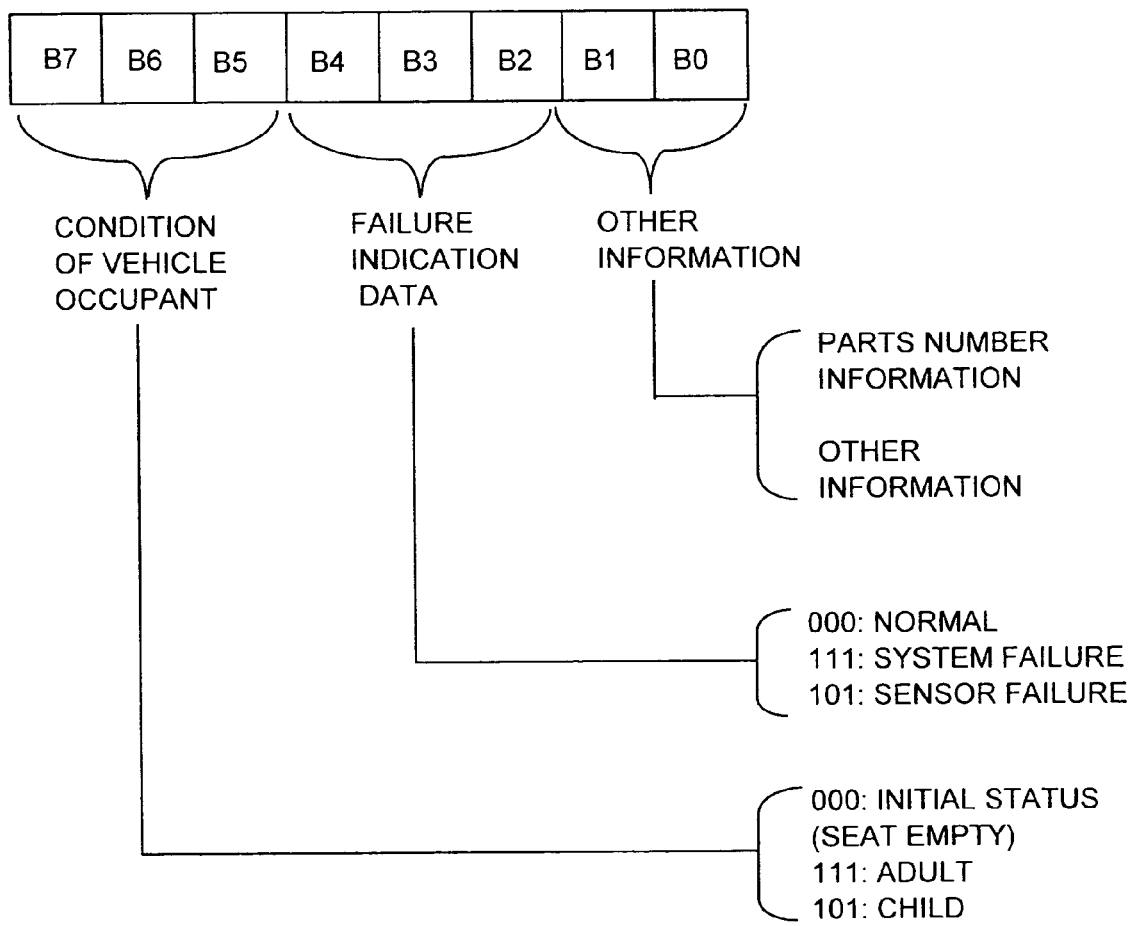
FIG. 5B shows the format whereby respectively different categories of data are transmitted.

The seat occupancy judgement results thereby obtained by these threshold comparison operations are then converted to encoded data by the CPU 11, and transmitted via the communication line 45 to the air bag CPU 43 as part of a serial data stream. The data configuration of the serial data is illustrated in FIG. 5A. As shown, this consists of a start bit, followed by a data portion, followed by a stop bit. The format of the data portion is illustrated in FIG. 5B. As shown, this consists of 8 bits or more, and includes the aforementioned results of the seat occupancy judgement (i.e., expressing whether the vehicle seat 5 is unoccupied or is occupied by a child, or by an adult), together with diagnostic information indicative of any system or sensor failure, and also parts number information, and any other sensor information which may be used in seat occupancy judgement, such as the on/off status of a switch which is mounted in the back of the vehicle seat 5, etc.

By transmitting data to the air bag ECU 43 in encoded form in this way, increased reliability of detecting the contents of the received digital signal by the air bag ECU 43 is achieved. It would be possible to further increase the reliability of transferring the occupancy status judgement result data to the air bag ECU 43 by inserting parity bits in the data, performing data mirroring, etc.

As can be understood from the above description, the present invention makes it unnecessary to provide a power supply adjacent to the load sensors of a vehicle seat, so that each of these load sensors can be made small in size, and so can be readily mounted in a suitable location such as on the rails of a seat whose occupancy status is being monitored.

Moreover due to the fact that the same power supply is used in common by both the CPU 11 and the load sensors 21, 22, 23, 24, the accuracy of converting the analog data from the load sensors to digital data is unaffected by variations in the power source voltage, i.e., is unaffected by the inevitable variations that occur in the voltage of the vehicle battery, which is the basic power source.

Furthermore since as described above the analog voltage signals from the load sensors are converted to digital data by the CPU 11, it is unnecessary to provide an A/D converter function by an apparatus located adjacent to the load sensors, which further assists in enabling the load sensors to be made small in size and of simple construction.

Moreover with the above embodiment since the results of judgement of the seat occupancy status are transmitted in encoded form to the air bag ECU 43, the information conveyed by the transmitted data can be received with a high degree of reliability by the air bag ECU 43.

It should be noted that various modifications could be envisaged to the above embodiment, which would fall within the scope claimed for the invention as set out in the appended claims. For example, with the above embodiment the judgement results are transmitted to an air bag ECU 43. However it would be equally possible to transmit the results of judgement of the seat occupancy status to some other type of vehicle occupant protection apparatus, such as a control apparatus of a seat belt that is equipped with a pre-tensioner device, or of a motor which rewinds a seat belt, etc. Hence, the above description is to be understood in a descriptive sense, and not in a limiting sense.

What is claimed is:

1. A vehicle occupant detection apparatus comprising: a control apparatus, and at least one load sensor for generating load data concerning a vehicle seat, said control apparatus comprising
   a processing section for judging vehicle occupant status based upon said load data,
   a power supply section for supplying electrical power to said processing section, and
   a communication section for transmitting results of said judgement of vehicle occupant status by said processing section to a vehicle occupant protection apparatus;
   wherein said load sensor is supplied with electrical power from said power supply section of said control apparatus, and said control apparatus further comprises at least one connecting lead for supplying the electrical power from said power supply section to said load sensor independently of the supplying of electrical power to said processing section.

2. A vehicle occupant detection apparatus as claimed in claim 1, wherein said load sensor produces said load data in the form of an analog voltage signal, and said control apparatus comprises analog-to-digital converter means for converting said analog voltage signal to digital data.

3. A vehicle occupant, detection apparatus as claimed in claim 1, wherein said processing section of said control apparatus performs encoding of said results of said judgement of vehicle occupant status, and wherein resultant encoded data are transmitted by said communication section to said vehicle occupant protection apparatus.

4. A vehicle occupant detection apparatus as claimed in claim 1, wherein the vehicle occupant status is one of empty, child and adult.

5. A vehicle occupant detection apparatus as claimed in claim 1, wherein the processing section indicates failure data.

6. A vehicle occupant detection apparatus as claimed in claim 1, wherein the load sensor produces a signal having a level proportional to a strain produced by an occupant of the vehicle.

7. A vehicle occupant detection apparatus as claimed in claim 1, wherein the processing section is configured to facilitate obtaining a weight value representative of a weight of an occupant responsive to said load data, and checking whether the weight value exceeds at least one threshold value to determine whether a corresponding value for the vehicle occupant status.

8. A vehicle occupant detection apparatus as claimed in claim 1, where the results are transmitted as a serial data stream.

9. A vehicle occupant detection apparatus comprising: a control apparatus, and at least one load sensor for generating load data concerning a vehicle seat, said control apparatus comprising
   a processing section for judging vehicle occupant status based upon said load data, a power supply section for supplying electrical power to said processing section, and a communication section for transmitting results of said judgement of vehicle occupant status by said processing section to a vehicle occupant protection apparatus;

wherein said load sensor is supplied with electrical power from said power supply section of said control apparatus, and said control apparatus further comprises at least one connecting lead for supplying the electrical power from said power supply section to said load sensor independently of the supplying of electrical power to said processing section;

wherein said load sensor produces said load data in the form of an analog voltage signal, and said control apparatus comprises analog-to-digital converter means for converting said analog voltage signal to digital data;

wherein said processing section of said control apparatus performs encoding of said results of said judgement of vehicle occupant status; and wherein resultant encoded data are transmitted by said communication section to said vehicle occupant protection apparatus.

10. A vehicle occupant detection apparatus as claimed in claim 9, wherein the vehicle occupant status is one of empty, child and adult.

11. A vehicle occupant detection apparatus as claimed in claim 9, wherein the processing section indicates failure data.

12. A vehicle occupant detection apparatus as claimed in claim 9, wherein the load sensor produces a signal having a level proportional to a strain produced by an occupant of the vehicle.

13. A vehicle occupant detection apparatus as claimed in claim 9, wherein the processing section is configured to facilitate obtaining a weight value representative of a weight of an occupant responsive to said load data, and checking whether the weight value exceeds at least one threshold value to determine whether a corresponding value for the vehicle occupant status.

14. A vehicle occupant detection apparatus as claimed in claim 9, wherein the results are transmitted as a serial data stream.

* * * * *